(12) United States Patent
Bansal et al.

(10) Patent No.: US 6,208,726 B1
(45) Date of Patent: Mar. 27, 2001

(54) SYSTEM AND METHOD FOR AUTOMATED EMERGENCY CALL BREAKTHROUGH

(75) Inventors: Pradeep K. Bansal, Dayton; Lee Begeja, Gillette; Jeffrey Joseph Farah, North Brunswick; Rajesh Kapadia, Plainsboro; Bernard S L Renger, New Providence; Benjamin J. Stern, Morristown Township, all of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/198,106

(22) Filed: Nov. 23, 1998

(51) Int. Cl.$^7$ ............................ H04M 3/42; H04M 3/436
(52) U.S. Cl. .................... 379/208; 379/196; 379/218; 379/903
(58) Field of Search ...................................... 379/188, 196, 379/197, 198, 201, 207, 208, 218, 903

(56) References Cited

U.S. PATENT DOCUMENTS 5,757,899 * 5/1926 Boulware et al. ............... 379/207 X

* cited by examiner

*Primary Examiner*—Harry S. Hong

(57) ABSTRACT

An emergency breakthrough system allows users to break through a busy signal, using an automated rather than operator assisted technique. Upon receipt of a busy signal, rather than hanging up and dialing an operator to gain a manual assistance for third party call breakthrough, the calling party is able to keypad an enablement request, such as *85, requesting emergency call breakthrough. After that entry, the system awaits a breakthrough passcode, such as a four digit number, which if validated permits the user to breakthrough the busy signal and reach the called party, without operator intervention. Predesignated numbers can gain automated access by ANI identity of the calling number.

16 Claims, 4 Drawing Sheets

SYSTEM AND METHOD FOR AUTOMATED EMERGENCY CALL BREAKTHROUGH

BACKGROUND OF THE INVENTION

1. Field of Invention

The invention relates to the field of communications, and more particularly to an advanced call breakthrough service allowing desired parties to break through a busy telephone signal.

2. Description of Related Art

Emergency breakthrough systems have been available on the public switched telephone network (PSTN) for some time. When a caller desires to reach a telephone number which is producing a busy signal, the caller can currently dial the operator and, for a special charge, have the operator connect the caller into the called party's existing telephone call. However, the available scheme for urgent breakthrough access is cumbersome, and requires several minutes of time to obtain operator assistance and complete the breakthrough transaction. A technique for making emergency call breakthrough quicker, more reliable and more convenient is therefore desirable.

SUMMARY OF THE INVENTION

The invention overcoming these and other problems in the art relates to a system and method for automated emergency breakthrough into an existing telephone call, by which designated parties can enter a predetermined pass code to gain access to a busy called party, all without operator intervention. Called parties subscribing to the service can share their designated passcode with parties they wish to have automated access to this extended functionality, which is faster, more convenient and more controlled than operator-assisted versions.

BRIEF DESCRIPTION OF THE DRAWINGS

The invention will be described with reference to the accompanying drawings, in which like elements are designated with like numbers and in which.

DETAILED DESCRIPTION OF PREFERRED EMBODIMENTS

Figure 1:
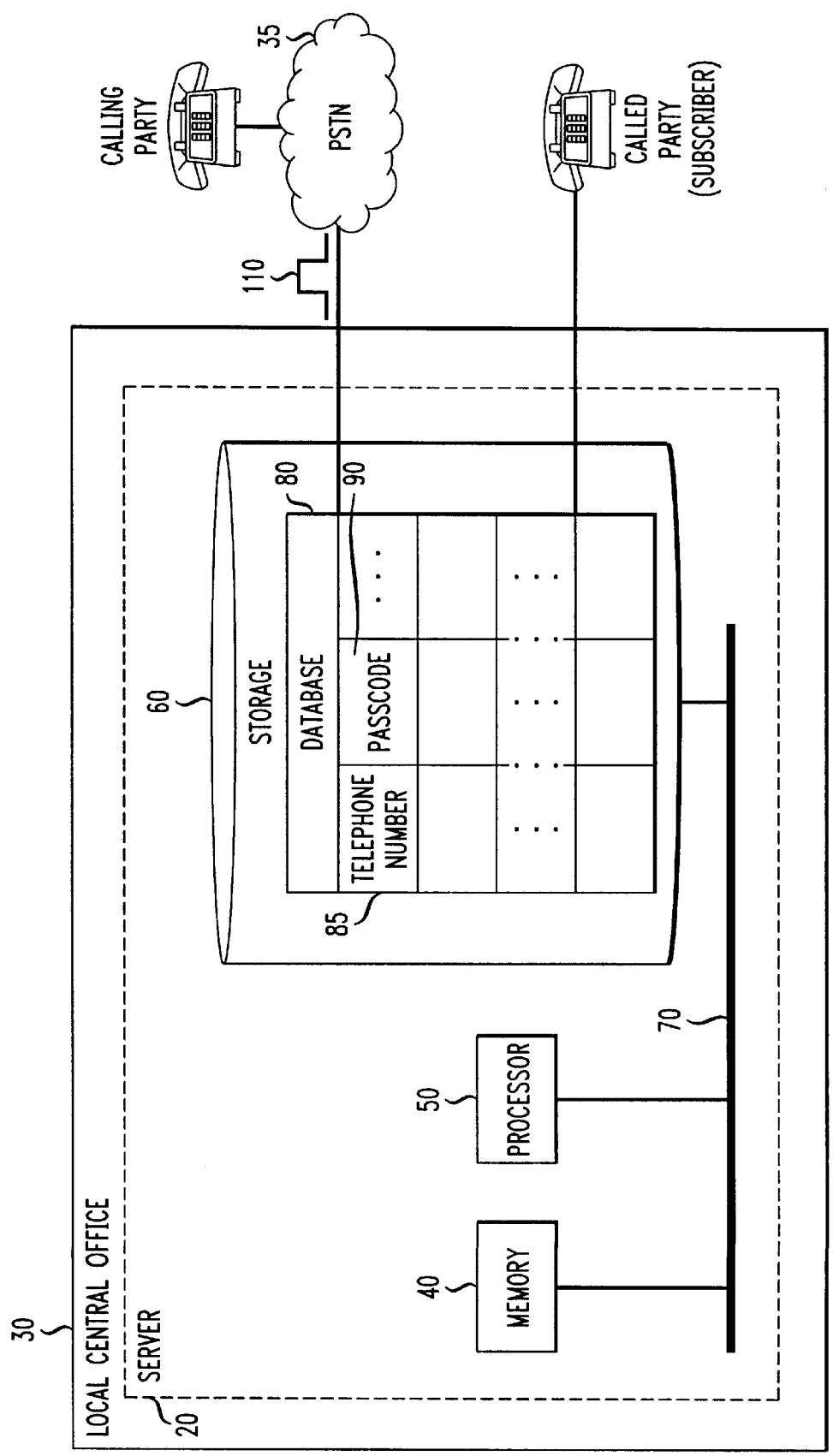
FIG. 1 illustrates a call breakthrough server according to the invention.

As illustrated in FIG. 1, in the system and method of the invention, an emergency call breakthrough server 20, which may be incorporated in the local central office (CO) 30 of the public phone network, includes processor 40, electronic memory 50, storage 60 and electronic bus 70 connecting associated components, as will be appreciated by persons skilled in the art. Each subscriber subscribing to the automated emergency breakthrough service of the invention has an entry in a breakthrough profile database 80, indicating that this person wishes to have non-assisted breakthrough capability of this type. The breakthrough profile database 80 contains, for each subscriber entry in the database, a breakthrough passcode 90 known only to the subscriber. The subscriber can distribute that breakthrough passcode 90 to persons he or she wishes to have access to the service.

Figure 3:
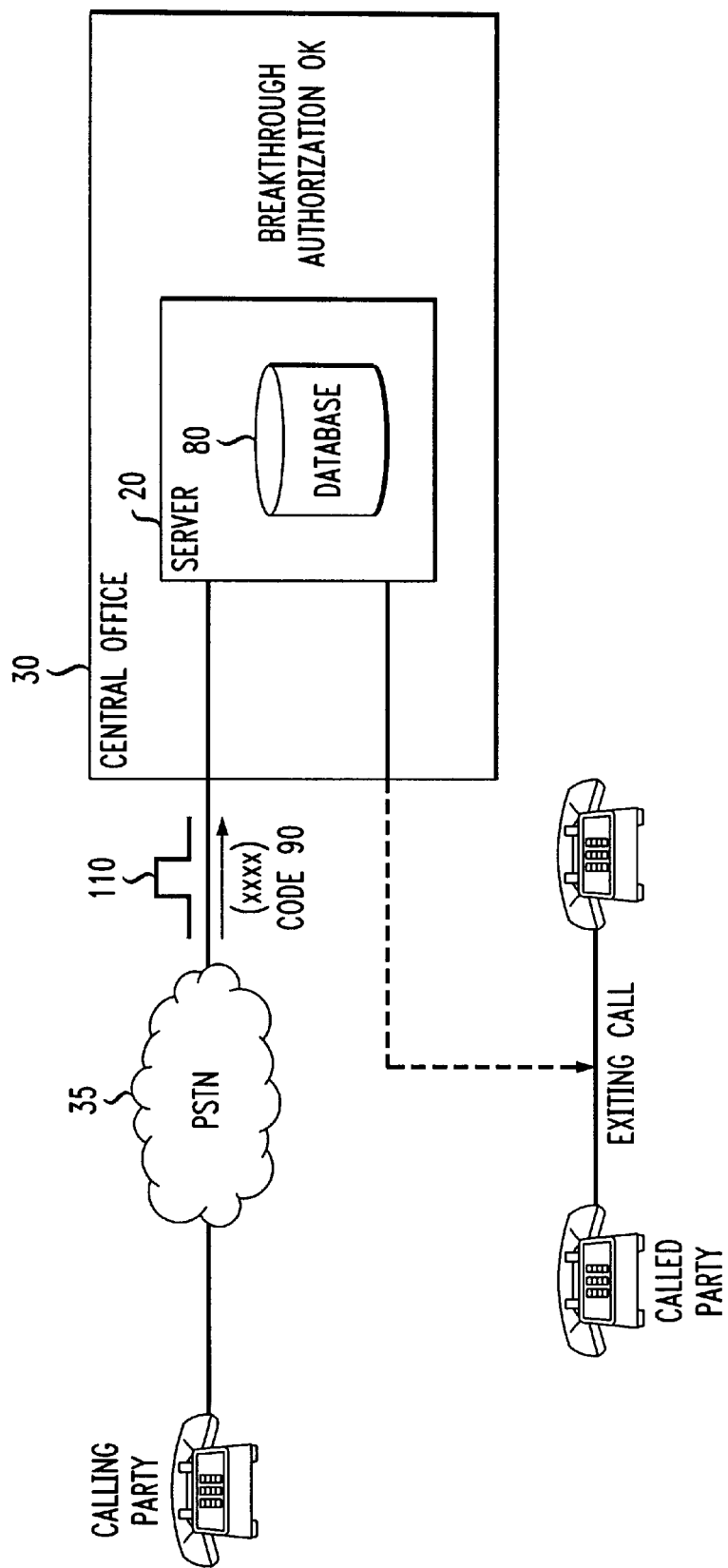
FIG. 3 illustrates the operation of a call breakthrough according to the invention.

As illustrated in FIG. 3, when a calling party calls the subscribing party via PSTN 35 and receives for example a busy signal, the central office 30 transmits that conventional signaling to the calling party. However, the central office 30 is configured to receive from the calling party a breakthrough enablement code 110, for example *85, indicating to the central office that the calling party wishes to access the automated emergency breakthrough system.

Upon receipt of the breakthrough enablement code 110, central office 30 interfaces with emergency breakthrough server 20 to process an emergency breakthrough request. Upon receipt of a breakthrough enablement code 110, the central office 30 removes the busy signal tones transmitted to the calling party, and accesses breakthrough profile database 80. Upon verifying that the called telephone number 85 dialed by the calling party is a subscriber to the automated breakthrough system, the central office 30 removes the busy signal transmitted to the calling party. At this time, breakthrough server 20 awaits entry of a breakthrough passcode, such as a four digit number.

When the calling party keys in a correct breakthrough passcode 90 matching the passcode for the subscriber stored in breakthrough profile database 80, the central office 30 intervenes in the existing telephone conversation and connects the calling party to the called number. The party on the existing call is given a message, such as "Your party has received an emergency breakthrough call. Please hold, your call will be restored when that call is complete", and their connection is put on hold. Once the telephone call of the calling party who has broken in is complete, the original connection to the called party is restored.

If the breakthrough passcode 90 does not match the passcode associated with the dialed number in breakthrough profile database 80, the central office 30 plays a brief message asking the calling party to retry, such as "enter your breakthrough passcode again". If properly entered, the calling party is connected, whereas if another incorrect passcode is entered, the calling party is disconnected.

Figure 2:
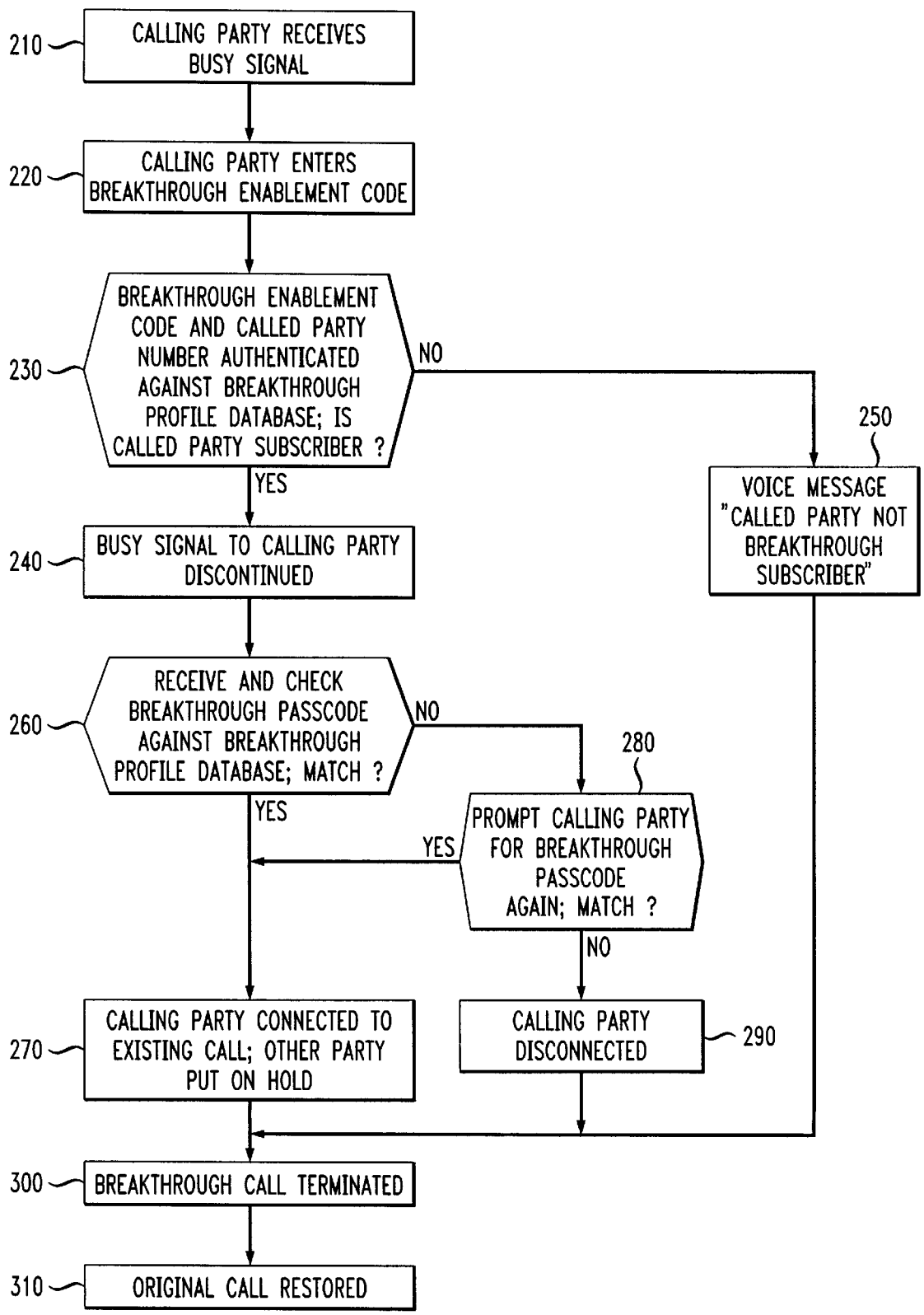
FIG. 2 illustrates a flowchart showing call processing according to the invention.

In terms of general call processing, as illustrated in FIG. 2 a calling party dials a called party and receives a busy signal, in step 210. In step 220, the calling party enters a breakthrough enablement code. In step 230, the breakthrough enablement code and called party phone number are authenticated against breakthrough profile database 80. If the called party is a subscriber, processing proceeds to step 240, in which the busy signal to the calling party is discontinued. If the called party is not a subscriber, in step 250 the calling party is given a voice message such as "The party you called is not a call breakthrough subscriber" and the call ends. Also, if desired in implementation of the invention the subscriber can enter a breakthrough defeat code, such as *86, on a per-call basis to disable the automatic call breakthrough ability of calling parties, even those with properly authenticated passcodes. This may be accomplished for instance by setting a disablement flag in breakthrough profile database 80 upon receipt of *86 or other codes. In this embodiment, the calling party receives a message such as "The party you called has disabled breakthrough privileges for the present call" or the like.

When the called party is a subscriber, after step 240 the breakthrough server 20 checks the entered breakthrough passcode 90 against breakthrough profile database 80 for that subscriber, in step 260. If the breakthrough passcode 90 matches, in step 270 the calling party is connected to the existing call, and the party on the existing call is prompted to hold. If breakthrough passcode 90 does not match the passcode stored for that subscriber, in step 280 the calling party is prompted again to enter breakthrough passcode 90. If the second entry matches, processing proceeds to step 270 to enter the existing call. If the second entry does not match, the calling party is disconnected in step 290. After the calling party's call connected at step 270 is finished or the calling party is disconnected in step 290, in step 300 the interrupting call ends and in step 310, the original call is restored.

Figure 4:
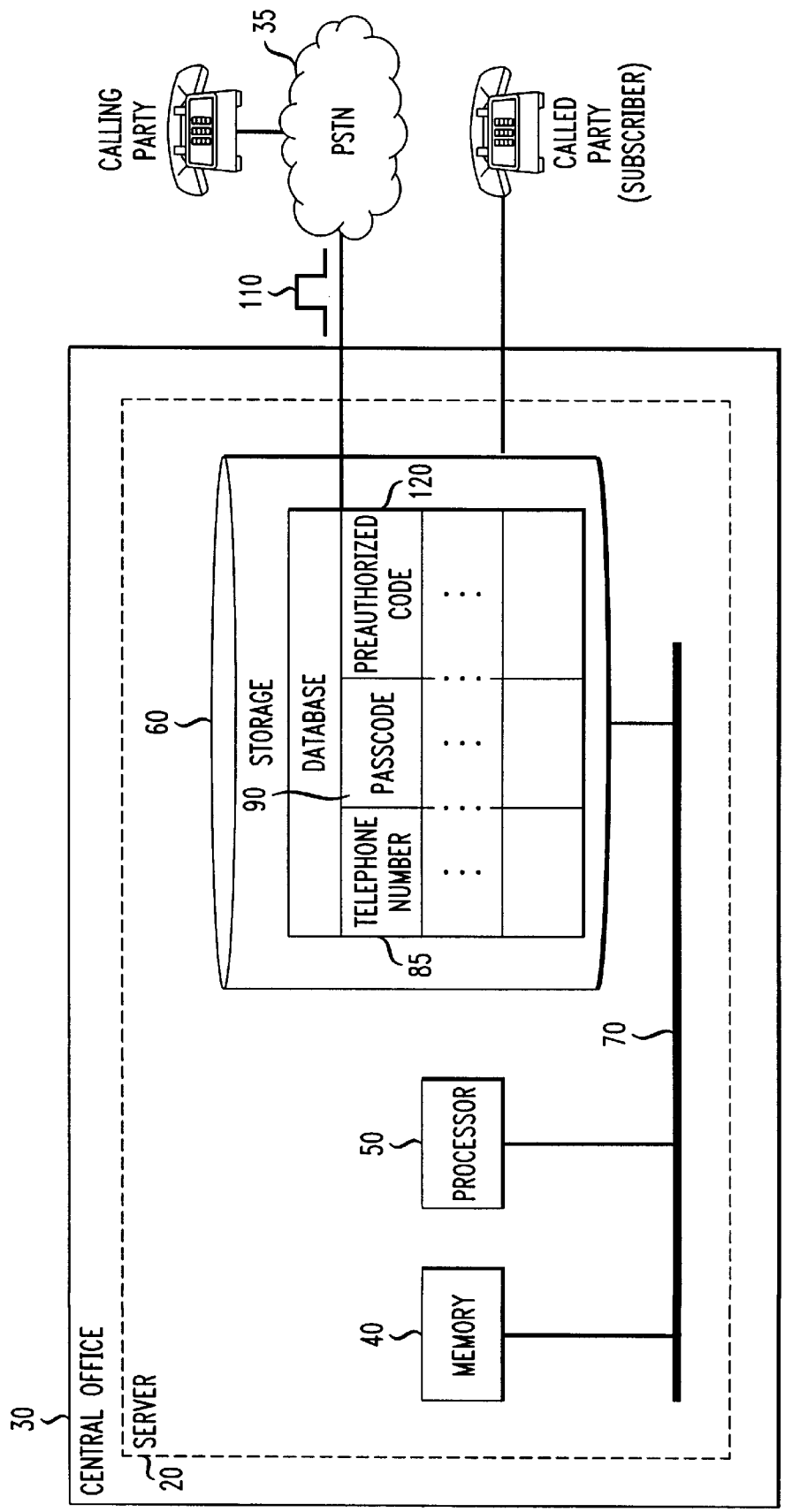
FIG. 4 illustrates an alternative embodiment of a call breakthrough system according to the invention.

In an alternative embodiment of the invention illustrated in FIG. 4, the subscriber can choose to include a preauthorized data field 120 in breakthrough profile database 80. Preauthorized data field 120 consists of a set of telephone numbers of preauthorized parties the subscriber wishes to automatically be granted breakthrough privileges. In this embodiment, the conventional ANI (Automatic Number Identification) code signaling the calling party's number is automatically checked against preauthorized data field 120 in breakthrough profile database 80. When the calling party's ANI code matches the preauthorized data field 120, the calling party is directly connected to the subscriber without further querying and input. Calling parties who are not listed on preauthorized data field 120 are presented with the same input queries as in the first embodiment.

Because access to an emergency breakthrough connection to the called party is not processed via operator workstations, and breakthrough setup and processing is handled in an automated server, processing speed is greatly improved compared to the manual case. The calling parties with an urgent need to connect through a busy signal, such as children calling their parents, therefore complete a breakthrough transaction much more quickly and conveniently than using the manually-assisted variety. User convenience and customer satisfaction are increased, all the while allowing the subscriber to the advanced service to control parties able to invoke the automated technique.

The foregoing description of the system and method of the invention is illustrative, and variations in configuration and implementation will occur to persons skilled in the art. For instance, while the breakthrough call has been described in terms of a call process using plain old telephone service (POTS), the invention could be applied to other communication formats such as ISDN, IP (Internet Protocol) telephony, digital telephony or Wireless Communications. The scope of the invention is accordingly intended to be limited only by the following claims.

What is claimed is:

1. A system for providing call breakthrough service, comprising:
    a first interface for receiving a request for breakthrough service from a calling party calling a subscriber;
    a breakthrough profile database, containing a list of subscribers subscribing to breakthrough service;
    a processor, connected to the breakthrough profile database, the processor processing the request for breakthrough service by interrogating the breakthrough profile database to determine the validity of the breakthrough request; and
    a second interface, connected to the processor, for connecting the calling party to the subscriber when the breakthrough request is validated.

2. The system of claim 1, wherein the processor performs breakthrough validation by verifying the subscriber subscribes to the breakthrough service by interrogating the breakthrough profile database, and by verifying a breakthrough password entered by the calling party.

3. The system of claim 1, wherein a breakthrough profile server is located in a local central office of the public switched telephone network.

4. The system of claim 1, wherein a breakthrough password is modifiable by the subscriber.

5. The system of claim 1, wherein the breakthrough service is defeatable by the subscriber on a per-call basis.

6. The system of claim 1, wherein an original call of the called party is restored after completion of the breakthrough service.

7. The system of claim 1, wherein a breakthrough profile server is located in an IP telephony network.

8. The system of claim 1, wherein a breakthrough profile server is located in a wireless network.

9. A method for providing call breakthrough service, comprising:
    presenting a first interface for receiving a request for breakthrough service from a calling party to a subscriber;
    accessing a breakthrough profile database, containing a list of subscribers subscribing to the breakthrough service;
    processing the request for breakthrough service by interrogating the breakthrough profile database to determine the validity of the breakthrough request; and
    connecting the party making the breakthrough request to the subscriber when the breakthrough request is validated.

10. The method of claim 9, wherein the validating is performed by verifying the subscriber subscribes to the breakthrough service by interrogating the breakthrough profile database, and by verifying a breakthrough password entered by the calling party.

11. The method of claim 9, wherein the breakthrough profile server is located in a local central office of the public switched telephone network.

12. The method of claim 9, wherein a breakthrough password is modifiable by the subscriber.

13. The method of claim 9, wherein the breakthrough service is defeatable by the subscriber on a per-call basis.

14. The method of claim 9, further comprising the step of restoring an original call of the called party after completion of the breakthrough service.

15. The system of claim 9, wherein a breakthrough profile server is located in an IP telephony network.

16. The system of claim 9, wherein a breakthrough profile server is located in a wireless network.

* * * * *